United States Patent
Stokes et al.

(10) Patent No.: US 11,820,926 B1
(45) Date of Patent: Nov. 21, 2023

(54) PROGRAMMABLE ADHESIVE BASED UPON DIELS-ALDER CHEMISTRY

(71) Applicant: Geisys Ventures, LLC, Lunenburg, MA (US)

(72) Inventors: Kristoffer K Stokes, Lunenburg, MA (US); Philip J. Costanzo, San Luis Obispo, CA (US)

(73) Assignee: Geisys Ventures, LLC, Lunenburg, MA (US)

( * ) Notice: Subject to any disclaimer, the term of this patent is extended or adjusted under 35 U.S.C. 154(b) by 84 days.

(21) Appl. No.: 17/510,743

(22) Filed: Oct. 26, 2021

Related U.S. Application Data (60) Provisional application No. 63/106,105, filed on Oct. 27, 2020.

(51) Int. Cl.

| | |
|---|---|
| *C09J 9/00* | (2006.01) |
| *C09J 4/00* | (2006.01) |
| *C08G 18/69* | (2006.01) |
| *C08G 18/20* | (2006.01) |
| *C08G 18/24* | (2006.01) |

(52) U.S. Cl.
CPC ............ *C09J 9/00* (2013.01); *C08G 18/2018* (2013.01); *C08G 18/246* (2013.01); *C08G 18/69* (2013.01); *C09J 4/00* (2013.01); *C08G 2170/00* (2013.01)

(58) Field of Classification Search
CPC ........... C09J 9/00; C09J 4/00; C08G 18/2018; C08G 18/246; C08G 18/69
See application file for complete search history.

(56) References Cited

U.S. PATENT DOCUMENTS

| 7,812,069 B2 | 10/2010 | Costanzo et al. | |
| 2010/0099798 A1* | 4/2010 | Costanzo | C08F 222/40 523/180 |
| 2012/0082840 A1* | 4/2012 | Herr | C09J 133/16 427/398.1 |

OTHER PUBLICATIONS

Development of Polymeric Phase Change Materials On the basis of Diels-Alder Chemistry, Swanson et al. Macromolecules 2010, 43, 6135-6141.*
Amato, Dahlia N. et al.: "Synthesis and Evaluation of Thermally-Responsive Coatings Based upon Diels-Alder Chemistry and Renewable Materials", Polym. Chem. 2014, 5 (1), 69-76.

(Continued)

*Primary Examiner* — Michael L Leonard
(74) *Attorney, Agent, or Firm* — NK Patent Law (57) ABSTRACT

Disclosed is an adhesive formulation that, when stimulated by a defeatable stimulation, reduces an adhesive bonding force of the adhesive formulation and defeats the adhesive formulation. The adhesive formulation having (i) programmable linkages made from Diels-Alder adducts and (ii) a concentration of diene traps. The Diels-Alder adducts may be furan-maleimide, and the diene traps may be (i) latent alkenes and (ii) selected from functional groups that will create irreversible reations with furan. The adhesive formulation may be capable of being applied as a coating, and the adhesive formulation may be capable of being extruded. The adhesive formulation may have a bonding temperature between 75 and 120° C. And the defeatable stimulation could, for example, be a temperature above 130° C. The adhesive formulation also may contain several types of programmable linkages and diene traps.

21 Claims, 3 Drawing Sheets

(56) References Cited

OTHER PUBLICATIONS

Swanson, John P et al.: "Development of Polymeric Phase Change Materials on the Basis of Diels-Alder Chemistry", Macromolecules 2010, 43, 6135-6141.
Sun, Hao et al.: "Macromolecular Metamorphosis via Stimulus-Induced Transformations of Polymer Architecture", Nat. Chem. 2017, 9 (8), 817-823. https://doi.org/10.1038/nchem.2730.
Zhang, Borui et al.: "Self-Healing, Malleable and Creep Limiting Materials Using Both Supramolecular and Reversible Covalent Linkages", Polym. Chem. 2015, 6 (42), 7368-7372.
Gheneim, Rana et al.: "Diels-Alder Reactions with Novel Polymeric Dienes and Dienophiles: Synthesis of Reversibly Cross-Linked Elastomers", Macromolecules 2002, 35, 7246-7253.
Bachler, Patricia R. et al.: "Modular Segmented Hyperbranched Copolymers", Polym. Chem. 2016, 7, 4155-4159.
Sun, Hao et al.: "Architecture-Transformable Polymers: Reshaping the Future of Stimuli-Responsive Polymers", Prog. Polym. Sci. 2019, 89, 61-75.
Sun, Hao et al.: "Thermally-Labile Segmented Hyperbranched Copolymers: Using Reversible-Covalent Chemistry to Investigate the Mechanism of Self-Condensing Vinyl Copolymerization", Chem. Sci. 2014, 5 (12), 4646-4655.

\* cited by examiner

PROGRAMMABLE ADHESIVE BASED UPON DIELS-ALDER CHEMISTRY

CROSS-REFERENCE TO RELATED APPLICATIONS

This application claims the benefit of U.S. Prov. Pat. App. No. 63/106,105, filed Oct. 27, 2020. The contents of this provisional application are incorporated herein by reference in their entirety.

BACKGROUND OF THE INVENTION

Technical Field

The present disclosure relates to an adhesive formulation.

Background

Adhesives are widely used to fasten materials together in manufacturing settings. The ease and large area applicability of these materials are useful for reducing labor costs while creating durable connections to value added assemblies.

Polyurethanes (PU) are used as both thermoplastic and thermoset-adhesives in consumer products ranging from apparel to electronic appliances, due to their manufacturing ease, environmental, and chemical stability. Despite their wide range of applications, PU have limitations regarding sustainability and defeatability that are magnified by their omnipresence, which is in direct opposition of Design for Disassembly (DfD) principles required to enable simple recycling and reuse. Typical PU products are designed with high heat resistance, limiting recyclability and recovery of starting materials, which contributes to global waste and prevents a circular economy from implementation. Furthermore, in cases where adhesive removal can occur (with hot melt adhesives), a key requirement is hot-work which is challenging and limits throughput and execution.

Thus, there exists a need to create a polyurethane type adhesive that can be applied easily for manufacturing purposes, is durable during the lifetime of the product, and can be readily defeated using a selected stimulus at the end of its usable life. This approach can encourage greater reuse and recovery of higher value components within the product. Furthermore, it can enable simpler rework and repair of durable consumer goods, leading to cost savings for manufacturers.

SUMMARY OF THE INVENTION

The present invention may address the need for an adhesive that may be selectively defeated at the end of life.

Programmable Linkages (PLs) are defined as chemical motifs with specific formation/cleavage conditions. These reactions have become increasingly popular methods for the preparation of materials due to their efficiency and ease of use. Importantly to this invention, they impart thermally responsive behavior. Diels-Alder chemistry is a specific type of PL that has been studied extensively, and the chemical reaction mechanisms are well understood. In a Diels-Alder reaction, a dienophile and a diene undergo a [4+2] cycloaddition to form a six membered ring. The electronic configurations of the diene and dienophile dictate the thermodynamic parameters for both the formation and cleavage of the ring structure. For temperature-induced retro Diels-Alder reactions, the diene is usually electron-rich, whereas the dienophile is electron-poor.

The most commonly utilized furan/maleimide Diels-Alder system undergoes adduct formation at temperatures between room temperature (RT) and 90° C.; however, because this is an equilibrium reaction, the cycloreversion begins to occur at 60° C. and becomes the dominant reaction at 90° C. The anthracene/maleimide system has been shown to display adduct formation starting at 90° C. with its retro reaction becoming dominant at approximately 120° C. Reacting either the furan or anthracene with an alkene forms an adduct that does not display significant overlap between adduction formation and cycloreversion. Since these equilibrium reactions overlap, it is possible to execute a Diels-Alder exchange, where the dissociated adducts can reform in new combinations with other components that are present in the system. For example, the furan/maleimide adduct can exchange into an anthracene/maleimide adduct.

Creation of a Defeatable Adhesive (DA) begins with the incorporation of Programmable Linkages (PLs). This demonstrates the versatility of the methodology to be applied to different substrates and the ability to tune the DA accordingly. Many of these approaches have been used for coating applications and as such, a multitude of synthetic design decisions were made to influence a range of physical properties. Here, we specifically design and formulate the balance of reversible and irreversible linkages to create an adhesive that can be durable for the lifetime of a product, but can be weakened or defeated by exposure to a stimulus. In this case, the stimulus is heat. By creating formulations that specifically target the available reversible and irreversible reactions, we can tailor the adhesion capability as well as the dehiscence behavior.

As previously stated, regardless of the base material employed, a design decision that will influence thermal programmability is the balance of reversible and irreversible crosslinks. Formulations can be customized depending on the Diels-Alder systems and the concentration of dienophile employed. By combining these various Diels-Alder systems, we will be able to program the exchange between linkages and dictate the balance of reversible and irreversible crosslinks.

This invention is directed towards adhering two substrates together. The substrates could include synthetic or natural fibers, blends of synthetic or natural fibers, synthetic or natural fiber-based textiles, textiles comprised of synthetic or natural fibers, plastic films and sheets, molded plastic parts, paper, ceramics, glass, metals, or any combination thereof.

The composition of the formulation requires a programmable linkage comprised of a Diels-Alder adduct, selected as a combination of diene and dienophile. The diene from the list of modified furan, modified fulvene, modified anthracene, modified conjugated alkenes (such as butadiene and its derivatives), modified conjugated imines (known as an aza Diels-Alder type reaction). The dienophile functionality can be selected from a list of modified maleimide, modified alkene, modified alkyne, modified imide (known as imide Diels-Alder type reaction), modified aldehydes (known as an oxo-Diels-Alder type reaction), or modified ketones.

This programmable linkage can be installed in- or ex-situ on a multifunctional polymer, typically an oligomeric or polymeric polyol of functionality 2.0 or greater for network forming capabilities. Such materials could include a variety of polymer classes selected for adhesive properties post formulation. These polymer classes could be polyolefins (including polyethylene, polypropylene, poly-1-hexene, polymethylpentene), polyesters (including PET, PBAT, PBT, and variations thereof), polyethers (including polyoxomethlyene, polyethylene glycol, polyethylene oxide, polypropylene oxide, polybutylene oxide, and polyphenylene ether), polystyrenes, polyhydroxyalkanoates, polyisoprenes, polybutadienes, polysiloxanes, polyimides, polyethersulfones, poly ether ether ketones, liquid crystal polymers, polyamides, polycarbonate, polyacrylates, and polyurethanes. Additional polyols that could be used include naturally derived polyols, such as carbohydrate based materials—including starches, mono and polysaccharides, and derivatives of naturally occurring oils—including soybean oil, rapeseed oil, castor oil, peanut oil, sunflower oil.

In order to obtain the desired defeatablity and dehiscence behavior the full adhesive formulation includes an additional diene trap. We define diene trap as a dienophile that will react with and capture free dienes that have been liberated through a retro Diels-Alder reaction or were intentionally added for desired properties. This mechanism will provide the network cleavage that will induce the desired adhesive failure. Additionally, a preferred diene trap will be selected from the previous list of dienophiles such that the adduct consisting of the available free diene and the diene trap does not undergo retro Diels-Alder at the temperature desired for defeatablity. In the examples below, the diene trap is the residual alkenes present on polybutadiene, both on the furan-maleimide modified, and base hydroxy terminated polybutadiene. In other embodiments the diene trap may be an additional small molecule, oligomer, or polymeric species specifically added to tune properties including adhesion, flow, mechanical strength, bonding temperature, debonding temperature, and application or process properties.

In a full formulation, additional additives that do not interact specifically with the constituent diene, dienophile, or diene traps can be added to the mixture to add additional properties that improve processing, adhesion, flow, or aesthetic properties.

We will refer to the dienophile as A, the diene as B, and diene trap as AT. In some embodiments, the mole ratio of dienophile to diene, defined as A:B, will have an excess of diene, preferably with a mole ratio of 0.10-0.75, more preferably 0.10-0.50, and most preferably 0.15-0.30. The mole ratio of the diene trap to diene, defined as AT:B, will have an excess of diene trap, and will have a preferred mole ratio of 1-25, or more preferred 5-15.

As polymer networks can be assembled in a variety of manners, it is important to maintain the ratio of programmable linkages against the amount of non-programmable linkages. In the examples below, the programmable linkages (PL) are the maleimide-furan adducts and non-programmable (N) are the additional isocyanate functional groups that provide network connectivity but cannot thermally disassociate. For a fully debondable system, the PL:N ratio should be preferably 0.01-4, more preferably 0.1-1, and most preferably 0.5-0.9.

In the examples provided below, the adhesive formulations present themselves as solutions that can be coated on a release liner and treated as a hot melt adhesive film. These are sometimes referred to as "B-stage" thermoset materials. The temperature range for bonding these would be application dependent and debonding steps will take place at a temperature higher than the application temperature.

DETAILED DESCRIPTION

Figure 1:
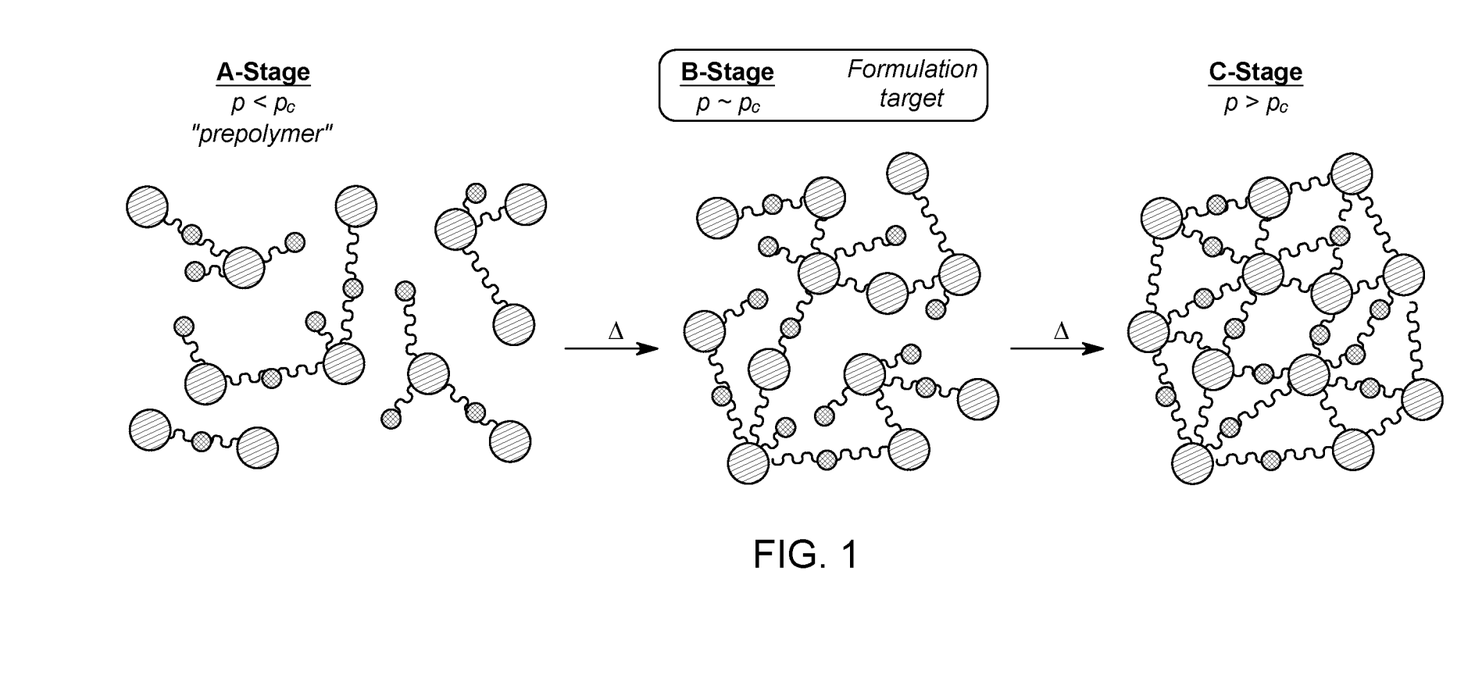
FIG. 1 depicts the stages of forming a polymer.

FIG. 1 shows the formation of a polymer using Diels-Alder adducts. As shown in that figure, in A-Stage, the prepolymer stage, cross-linking is minimal. With the addition of heat, the reaction proceeds into B-Stage, where a significant number, but not all, of the possible cross-linkages have formed. For adhesives, B-Stage may be particularly suitable for commercial use, since the adhesive can be applied to a surface and then cured to its final stage where the adhesive is activated. Further increasing the temperature shifts the reaction to C-Stage, in which full linkage occurs and the polymer is fully cured, i.e., the adhesive is now activated.

Figure 2:
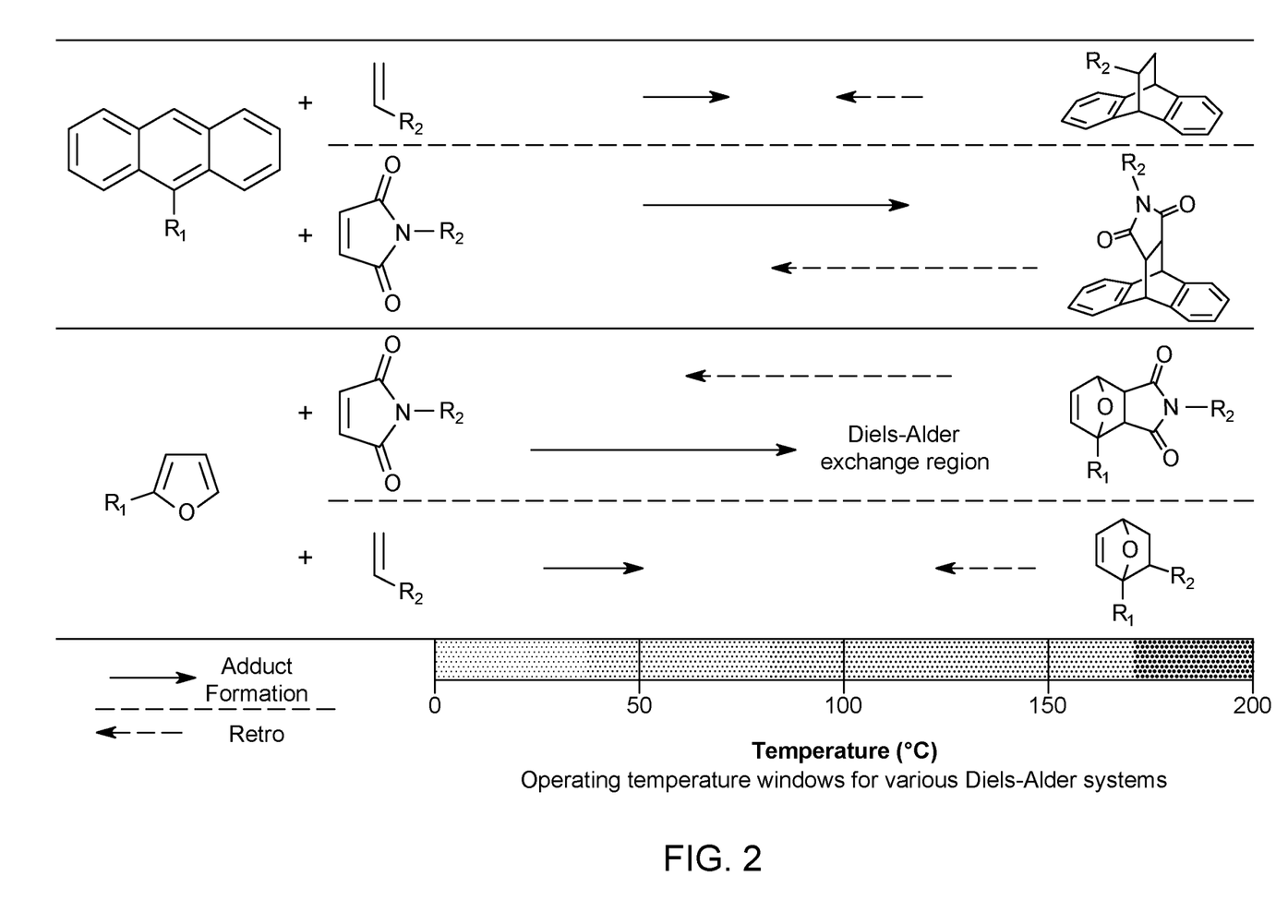
FIG. 2 depicts operating temperature windows for various Diels-Alder systems.

FIG. 2 shows the operating temperature windows for exemplary Diels-Alder systems. The top portion of that figure shows a Diels-Alder system involving modified anthracene (diene) and modified ethylene (dienophile) and modified maleimide (also a dienophile). The bottom portion of FIG. 2 depicts modified furan (diene) in a Diels-Alder system with these same two dienophiles. The arrows depict the temperature regions in which the normal adduct-forming Diels-Alder reaction dominates (solid arrows) and in which the retro Diels-Alder reaction dominates (dashed arrows).

As discussed above, a desirable defeatable adhesive may be one such that the adduct composed of the available free diene and the "diene trap"—a particularly selected dienophile, as discussed above—does not undergo retro Diels-Alder reaction at the defeatable temperature. That is, at the defeatable temperature, diene-dienophile adducts, i.e., adducts not including the diene trap, will undergo retro Diels-Alder reaction and separate; however, diene-diene trap adducts will not undergo retro Diels-Alder at this same temperature.

In the bottom of FIG. 2, the adduct formed by the modified furan (diene) and the modified ethylene (acting as a diene trap) does not undergo significant retro Diel-Alder reaction until the temperature approaches 150° C. Conversely, the retro Diels-Alder reaction is the dominant reaction for the modified furan (diene) and modified maleimide (dienophile) adduct even before the temperature exceeds 100° C.

Thus, as FIG. 2 shows, there exists a region in which the diene-dienophile adducts are separating via retro Diels-Alder and the diene-diene trap adducts are not separating, and in fact, more diene-diene trap adducts may be forming between lone dienes separated from dienophiles by retro Diels-Alder and the remaining diene traps. Since the diene-dienophile adducts are the linkages holding the polymer together, heating the adhesive to this region and severing the diene-dienophile adducts thus defeats the adhesive. And so long as enough diene-diene trap adducts are formed, the polymer will not reform as the temperature drops, since any free dienes will likely have undergone a Diels-Alder reaction with the diene traps as soon as they were released from their diene-dienophile adducts.

In short, when the defeatable stimulation is applied, e.g., the polymer is heated to the defeatable temperature, the retro Diels-Alder reaction is the dominant reaction for the original diene-dienophile adduct and the adduct separates into diene and dienophile. But the diene trap is chosen such that the defeatable temperature is low enough that the adduct formed by the diene-diene trap does not undergo significant retro Diels-Alder reaction. Thus, any free dienes resulting from the retro Diels-Alder reaction in the original diene-dienophile are captured by the diene trap and do not reform, even if the defeatable stimulus is later removed, e.g., temperature is subsequently lowered. Since the diene-dienophile bonds are necessary to maintain the functioning of the adhesive, the capture of the dienes by the diene trap defeats the adhesive.

Figure 3:
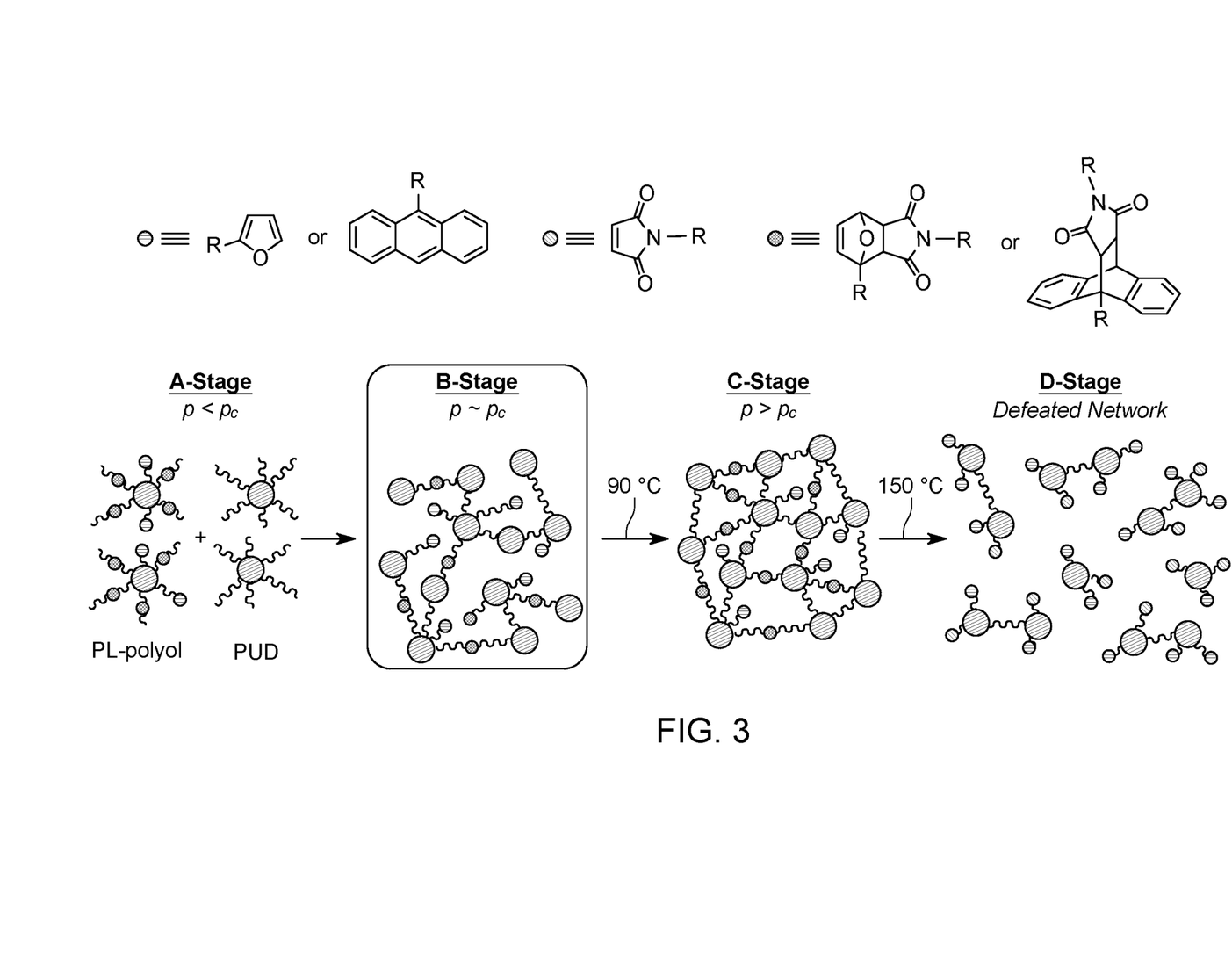
FIG. 3 depicts the stages of forming and defeating a defeatable polymer by increasing temperature.

This process of defeating the adhesive is shown in FIG. 3. That figure shows an A-Stage, B-Stage, and C-Stage similar to those of FIG. 1. However, in FIG. 3, the specific examples of modified furan (diene), modified anthracene (diene) and modified maleimide (dienophile) are used. In addition to these three stages, FIG. 3 also depicts "D-Stage," in which the network is defeated by increasing the temperature until the diene-dienophile adducts separate. As mentioned above, the diene trap will then react with the free dienes to create diene-diene trap adducts, preventing the reformation of polymer linkages and thus defeating the adhesive.

As discussed above, achieving this behavior involves creating a balance between the reversible and irreversible linkages in order to ensure that the resulting adhesive can both (i) last for the lifetime of the intended product and (ii) be weakened or defeated when exposed to the defeatable stimulus. By creating formulations that specifically target the defeatable stimulus, e.g., temperature, it is possible to create an adhesive with strong adhesive capabilities that displays the desired dehiscence behavior.

A potentially important aspect in creating this defeatable behavior is the concentrations of the diene, dienophile, and diene trap. As discussed above, the dienophile is denoted by A, the diene by B, and the diene trap by AT. In some preferred embodiments, the concentration of diene will exceed that of the dienophile, as discussed above, preferably with a mole ratio of dienophile to diene, A:B, of 0.10-0.75, more preferably 0.10-0.50, and even more preferably 0.15-0.30. Likewise, in some preferred embodiments, the concentration of the diene trap exceeds the concentration of the diene, preferably with a mole ratio of diene trap to diene, AT:B, of 1-25, and more preferably 5-15.

As also discussed above, it may be important to maintain the ratio of programmable linkages to the amount of non-programmable linkages, i.e., linkages involving additional isocyanate functional groups that provide network connectivity but will not themselves thermally dissociate when the defeatable stimulus is applied. For a fully debondable system, a mole ratio between the programmable linkages and non-programmable linkages should be preferably 0.01-4.0, more preferably 0.1-1.0, and even more preferably 0.5-0.9.

Modified furan, modified anthracene, modified ethylene, and modified maleimide are used only as examples in this disclosure. As discussed above, the diene, dienophile, and diene trap may be any of those listed earlier, alone or in combination, so long as their combination results in a defeatable adhesive. Further, the use of increased temperature as a defeatable stimulus is also exemplary. The defeatable stimulus may be any stimulus that selectively allows for breaking down the bonds of the adhesive thus accomplishing the intended effect of the defeatable adhesive. Other defeatable stimuli might include, for example, lower temperature, changes in pH or pOH, application of defeatable agent, e.g., a chemical agent, application of pressure, or any other stimulus that selectively results in a defeatable adhesive.

Also, in a full formulation, any additional additives that do not interfere specifically with the specified diene, dienophile, and diene trap may be added to the formulation. For instance, such additives may include small molecule, oligomer, or polymeric species that are specifically added to tune properties like adhesion, flow, mechanical strength, bonding temperature, debonding temperature, application properties, process properties, or any other desired property that does not interfere with the adhesive defeatability mechanic.

Discussed below are the creation and testing of various manifestation of the adhesive described above. These experimental results are intended to be illustrative and not to limit the scope of the disclosure in any way.

Synthesis of PB-Derived Adhesive Formulations

The following section outlines typical procedures for preparation of the thermally-defeatable adhesive product (PL/PB). Experiments were conducted according to the general synthetic procedures outlined below, with specific chemical compositions and reagent amounts reported in Table 1. Various reaction conditions were employed according to key synthetic variables and chemical ratios explored, as shown in Table 2.

All formulations were subsequently drawn down with a #50 mayer rod on a one side silicone coated release liner and prepared for adhesive testing.

TABLE 1

| | | | | | | |
|---|---|---|---|---|---|---|
| Composition of materials prepared: Reagent amounts added | | | | | | |
| General Formulation Procedure | Sample | 1,6 HMDI | 1st Addition Of 2-FA | HTPB | 2nd Addition Of 2-FA | PM |
| A | HRD 7-A13 | 4.27 mL (26.4 mmol) | 1.53 mL (17.6 mmol) | 29.8 g (10.6 mmol) | 0.77 mL (8.82 mmol) | 5 g (26.7 mmol) |
| | HRD 9-A15 | 3.22 mL (20.1 mmol) | 0.78 mL (8.93 mmol) | 15 g (5.36 mmol) | 0.39 mL (4.47 mmol) | 2.5 g (13.4 mmol) |
| | HRD 10-A16 | 3.22 mL (20.1 mmol) | 1.16 mL (13.4 mmol) | 5 g (1.78 mmol) | 0.39 mL (4.47 mmol) | 3.34 g (17.87 mmol) |
| | JAP 26-A52 | 3.21 mL (20.1 mmol) | 0.78 mL (8.93 mmol) | 15 g (5.36 mmol) | .39 mL (4.46 mmol) | 2.51 g (13.4 mmol) |
| | JAP 27-A54 | 2.14 mL (13.4 mmol) | 0.78 mL (8.93 mmol) | 15 g (5.36 mmol) | .39 mL (4.47 mmol) | 2.51 g (13.4 mmol) |
| A2 | HRD 12-A18 | 2.98 mL (18.6 mmol) | 1.3 mL (14.9 mmol) | 25 g (8.9 mmol) | 0.65 mL (7.44 mmol) | 2.09 g (11.2 mmol) |
| | JAP 29-A58 | 3.6 mL (22.3 mmol) | 1.29 mL (14.9 mmol) | 25 g (8.93 mmol) | .65 ml (7.4 mmol) | 4.17 g (22.3 mmol) |
| | HRD 13-A19 | 4.29 mL (26.78 mmol) | 1.3 mL (14.9 mmol) | 25 g (8.93 mmol) | 0.65 mL (7.44 mmol) | 4.17 g (22.3 mmol) |
| | JAP 29-A59 | 3.6 mL | 1.29 mL | 25 g | .65 mL | 4.17 g |

TABLE 1-continued

Composition of materials prepared: Reagent amounts added

| General Formulation Procedure | Sample | 1,6 HMDI | 1st Addition Of 2-FA | HTPB | 2nd Addition Of 2-FA | PM |
|---|---|---|---|---|---|---|
| | | (22.3 mmol) | (14.9 mmol) | (8.93 mmol) | (7.4 mmol) | (22.3 mmol) |
| | HRD 19-A26 | 4.29 mL | 1.3 mL | 25 g | 0.65 mL | 4.17 g |
| | | (26.78 mmol) | (14.9 mmol) | (8.93 mmol) | (7.44 mmol) | (22.3 mmol) |
| | JAP 36-A74 | 4.29 mL | 1.3 mL | 25 g | .65 mL | 4.17 g |
| | | (26.8 mmol) | (14.9 mmol) | (8.93 mmol) | (7.4 mmol) | (22.3 mmol) |
| | HRD-15-A21 | 3.57 mL | 1.3 mL | 25 g | 0.65 mL | 4.17 g |
| | | (22.3 mmol) | (14.9 mmol) | (8.9 mmol) | (7.44 mmol) | (22.3 mmol) |
| A3 | JAP 30-A60 | 3.6 mL | 1.29 mL | 25 g | .65 mL | 4.17 g |
| | | (22.3 mmol) | (14.9 mmol) | (8.93 mmol) | (7.4 mmol) | (22.3 mmol) |
| C | HRD 14-A20 | 5.4 mL | 1.94 mL | 25 g | 0 | 4.17 g |
| | | (33.5 mmol) | (22.3 mmol) | (8.9 mmol) | | (22.3 mmol) |
| D | HRD 18-A25 | 2.62 mL | 0.78 mL | 25 g | 0.39 mL | 2.5 g |
| | | (16.37 mmol) | (8.93 mmol) | (8.93 mmol) | (4.47 mmol) | (13.4 mmol) |
| | JAP 31-A62 | 3.6 mL | 1.29 mL | 25 g | .65 mL | 4.17 g |
| | | (22.3 mmol) | (14.9 mmol) | (8.93 mmol) | (7.4 mmol) | (22.3 mmol) |
| | JAP 32-A64 | 3.15 mL | 0.78 mL | 25 g | 0.39 mL | 2.5 g |
| | | (19.64 mmol) | (8.93 mmol) | (8.93 mmol) | (4.47 mmol) | (13.39 mmol) |
| | JAP 33-A66 | 4.29 mL | 1.29 mL | 25 g | .64 mL | 4.17 g |
| | | (27.76 mmol) | (14.9 mmol) | (8.93 mmol) | (7.4 mmol) | (22.3 mmol) |
| | JAP 34-A68 | 3.6 mL | 1.29 ml | 25 g | .65 mL | 4.17 g |
| | | (22.3 mmol) | (14.9 mmol) | (8.93 mmol) | (7.4 mmol) | (22.3 mmol) |

TABLE 2

Composition of materials prepared: Key synthetic ratios explored.

| Formulation | Sample | Eq. NCO:OH (Initial 2-FA addition) | Eq. NCO:OH (Overall) | Eq. HTPB:Diels-Alder | Amount of 2-FA added 1st addtn.:2nd addtn. | mL. THF:g. HTPB |
|---|---|---|---|---|---|---|
| A | HRD 7-A13 | 3:1 | 1:1.5 | 1:2.5 | 2:1 | N/A |
| | HRD 9-A15 | 4.5:1 | 1:1 | 1:1 | 2:1 | 1.27:1 |
| | HRD 10-A16 | 3:1 | 1:1 | 1:4 | 3:1 | 3.36:1 |
| | JAP 26-A52 | 4.5:1 | 1:1 | 1:2.5 | 2:1 | 1:1 |
| | JAP 27-A54 | 3:1 | 1:1.5 | 1:2.5 | 2:1 | 0.77:1 |
| A2 | HRD 12-A18 | 3.7:1 | 1:1.5 | 1:2.5 | 2:1 | 1.07:1 |
| | HRD 13-A19 | 3.6:1 | 1:1.25 | 1:2.5 | 2:1 | 1:1 |
| | JAP 29-A59 | 3:1 | 1:1.5 | 1:2.5 | 2:1 | 1:1 |
| | HRD 19-A26 | 3.6:1 | 1:1.25 | 1:2.5 | 2:1 | 1:1 |
| | JAP 36-A74 | 3.6:1 | 1:1.25 | 1:2.5 | 2:1 | 1.05:1 |
| A3 | JAP 30-A60 | 3:1 | 1:1.5 | 1:2.5 | 2:1 | 1:1 |
| C | HRD 14-A20 | 3:1 | 1:1 | 1:2.5 | 1:0 | 1:1 |
| D | HRD 18-A25 | 3.7:1 | 1:1.5 | 1:1.5 | 2:1 | 0.5:1 |
| | JAP 31-A62 | 3:1 | 1:1.5 | 1:2.5 | 2:1 | 0.58:1 |
| | JAP 32-A64 | 4.4:1 | 1:1.25 | 1:1.5 | 2:1 | 0.82:1 |
| | JAP 33-A66 | 3.6:1 | 1:1.25 | 1:2.5 | 2:1 | 0.78:1 |
| | JAP 34-A68 | 3:1 | 1:1.5 | 1:2.5 | 2:1 | 0.5:1 |

Representative Synthesis of Programmable Linkages

A representative example of the synthesis of polybutadiene(PB)-based programmable linkages follows. A magnetic stir bar and 1,6 hexamethylene diisocyanate (4.27 mL, 0.026 mol, 78 mmol NCO) are placed into a round bottom flask (RBF). Next, 2-furfuryl alcohol (1.53 mL, 0.017 mol, 1 eq OH) and one drop of catalyst DBTDL are combined in a separate flask and added at RT dropwise to the RBF containing 1,6 hexamethylene diisocyanate over the course of 15 min. The product is then verified via TLC. After an hour at room temperature add HTPB to the reaction flask (28.6 g, 25.5 mmol OH).

From here, the contents of the reaction flask are split, yielding RBF(A) and RBF(B), each with an equal, homogeneous mixture of the reaction contents. Into each new RBF, 2-furfuryl alcohol (0.383 mL, 4.25 mmol, 0.25 eq OH) is added. RBF(A) stirs at RT and RBF(B) at 60° C. for a duration of 2 hrs. Now, add phenolic maleimide (2.5 g, 0.0131 mol, 0.75eq) into both reaction flasks and let stir at 50° C. overnight.

A representative example of the synthesis of soybean-oil-based programmable linkages can be found in Costanzo, et Al. Polym. Chem., 2014, 5, 69-76). The contents of this article are hereby incorporated herein by reference in their entirety.

Adhesive Formulation 'A' General Procedure:

A 100 mL round bottom flask (RBF) was loaded with 1,6 hexamethylene diisocyanate (HMDI) and a magnetic stir bar and chilled over ice and brine for 10 minutes. In a separate vessel, 2-furfuryl alcohol (2-FA) and a drop of dibutyltin dilaurate (DBTDL) were combined and added into the reaction vessel dropwise while stirring. The reaction vessel was then removed from the ice and brine and allowed to stir at room temperature for 1 hour, adding minimal tetrahydrofuran (THF) to keep reagents dissolved. The amount of THF added overall through the reaction was not to exceed 1 mL THF for each gram of Hydroxyl-terminated polybutadiene (HTPB) (Poly bd® R45 HTLO) added. HTPB was then added with additional THF. Once the contents were homogeneously mixed, a second addition of 2-furfuryl alcohol was made. The mixture then stirred for 2 hours. At 30 this time, N-(4-Hydroxyphenyl)maleimide (PM) was added and the reaction stirred until homogeneously mixed by visual inspection. Once done, the vessel was then capped with a rubber septum, secured with copper wire, and placed in an oil bath to stir at 50° C. overnight. The product was then characterized via HNMR.

Adhesive Formulation 'A2' General Procedure:

A 100 mL RBF was loaded with HMDI and a magnetic stir bar and chilled over ice and brine for 10 minutes. In a separate vessel, 2-FA, a drop of DBTDL, and THF (20% by volume of 2-FA) were combined and added into the reaction vessel dropwise. The reaction vessel was then removed from the ice and brine and allowed to stir at room temperature for 1 hour. A solution of HTPB and THF (in a ratio of 1 mL of THF for each gram of HTPB) was then added. Once the contents were homogeneously mixed, a second addition of 2-FA was made and stirred at room temperature for 2 hours. At this time, PM was added and stirred into the reaction until homogeneously mixed by visual inspection. The vessel was then capped with a rubber septum, secured with copper wire, and remained stirring in an oil bath at 50° C. overnight. The product was then characterized via HNMR.

Adhesive Formulation 'A3' General Procedure:

A 100 mL RBF was loaded with HMDI and a magnetic stir bar and chilled over ice and brine for 10 minutes. In a separate vessel, 2-FA and a drop of DBTDL were combined and added into the reaction vessel dropwise. The reaction vessel was then removed from the ice and brine and allowed to stir at room temperature for 1 hour. A solution of HTPB and THF (in a ratio of 1 mL of THF for each gram of HTPB) was then added. Once the contents were homogeneously mixed, a second addition of 2-FA was made and stirred at room temperature for 2 hours. At this time, PM was added and stirred into the reaction until homogeneously mixed by visual inspection. The vessel was then capped with a rubber septum, secured with copper wire, and remained stirring in an oil bath at 50° C. overnight. The product was then characterized via HNMR.

Adhesive Formulation 'C' General Procedure:

A 100 mL RBF was loaded with HMDI and a magnetic stir bar and chilled over ice and brine for 10 minutes. In a separate vessel, 2-FA and a drop of DBTDL were combined and added into the reaction vessel dropwise. The reaction vessel was then removed from the ice and brine and allowed to stir at room temperature for 1 hour. A solution of HTPB and THF (in a ratio of 1 mL of THF for each gram of HTPB) was then added, and the contents were homogeneously mixed. Next, PM was added and stirred into the reaction until homogeneously mixed by visual inspection. The vessel was then capped with a rubber septum, secured with copper wire, and remained stirring in an oil bath at 50° C. overnight. The product was then characterized via HNMR.

Adhesive Formulation 'D' General Procedure:

A 100 mL RBF was loaded with HMDI and a magnetic stir bar and chilled over ice and brine for 10 minutes. In a separate vessel, 2-FA and a drop of DBTDL were combined and added into the reaction vessel dropwise. The reaction vessel was then removed from the ice and THF was added, followed by a quick addition of HTPB (in a ratio of THF not to exceed 1 mL of THF for each gram of HTPB). Once the contents were homogeneously mixed, a second addition of 2-FA was quickly made, followed by an addition of PM that was stirred into the reaction until homogeneously mixed by visual inspection. The vessel was then capped with a rubber septum, secured with copper wire, and remained stirring in an oil bath at 50° C. overnight. The product was then characterized via HNMR.

Adhesive Formulation with Soybean Oil (SBO)-Based Programmable Linkage Free Alcohol SBO Non-Acetylated TR-SBO (6 g, 2.53 mmol) was added to a round bottom flask with a magnetic stir bar. Hydroxyl-terminated polybutadiene (12 g, 4.28 mmol) was added in full to the flask then left to stir for 45 minutes. The flask was removed from the stir plate and manually mixed for a minute before 3 drops of dibutyltin dilaurate were added in as a catalyst and stirred for another minute. 1,6-hexamethylene diisocyanate (2.64 mL, 16.5 mmol) was then added and mixed for a minute. The resin was periodically checked for cure progress and after 45 minutes drawdowns were performed with an RDS #50 bar.

Acetylated SBO

Acetylated TR-SBO (6 g, 2.3 mmol) and Hydroxyl-terminated polybutadiene (12 g, 4.28 mmol) were added to a 11-dram vial. The components were manually stirred until a cohesive mix was achieved (3 minutes) 0.3 drops of dibutyltin dilaurate were mixed in as a catalyst for a minute. 1,6-hexamethylene diisocyanate (1.69 mL, 10.53 mmol) was then added and mixed for a minute. The resin was periodically checked for cure progress and after 45 minutes drawdowns were performed with an RDS #50 bar and labeled as RTH 40.

Adhesive Testing of Defeatable Adhesive Formulations
General Procedure for Testing Formulations Formulation drawdowns were cut into 4 inch by 4 inch coupons and applied to a 4 inch by 6 inch sized 100% polyester knit fabric. The adhesive coupon was then tacked to the fabric through application of heat and pressure (typically 65° C. for 30 s) using a Nurxiovo manual heat press. The release liner was then removed from the laminate, leaving the adhesive exposed and another layer of fabric was applied to the stack. This configuration was then bonded under various combinations of time, temperature, and pressure to create a fully bonded laminate.

These laminate structures were cut into 1.0 inch strips and evaluated using a t-peel methodology on a universal tensile testing machine to evaluate the peel strength.

TABLE 3

Peel strength of various adhesive formulations after bonding.
N/A samples were either unable to bond or the strength
was too low to measure.

| Sample | Average Peel Strength (N/m) |
|---|---|
| HRD 7-A13 | 87 |
| HRD 9-A15 | 28 |
| HRD 10-A16 | 87 |
| JAP 26-A52 | N/A |
| JAP 27-A54 | N/A |
| HRD 12-A18 | N/A |
| JAP 29-A58 | 15 |
| HRD 13-A19 | 200 |
| JAP 29-A59 | 15 |
| HRD 19-A26 | N/A |

TABLE 3-continued

Peel strength of various adhesive formulations after bonding. N/A samples were either unable to bond or the strength was too low to measure.

| Sample | Average Peel Strength (N/m) |
|---|---|
| JAP 36-A74 | N/A |
| HRD-15-A21 | N/A |
| JAP 30-A60 | 15 |
| HRD 14-A20 | 12 |
| HRD 18-A25 | N/A |
| JAP 31-A62 | N/A |
| JAP 32-A64 | 160 |
| JAP 33-A66 | 50 |
| JAP 34-A68 | N/A |
| RTH 40 | 30 |

Debonding-Dehiscence Testing of Defeatable Adhesive Formulations

Samples that were bonded with over 100 N/m peel strength were exposed to 150° C. for 60 seconds on the heat press to determine strength after high heat exposure. After cooling, they were tested and had a peel strength too low for our instrument to measure.

What is claimed is:

1. An adhesive formulation, wherein when the adhesive formulation is stimulated by a defeatable stimulation an adhesive bonding force is reduced and the adhesive formulation is defeated, the adhesive formulation comprising (i) programmable linkages made from Diels-Alder adducts and (ii) a concentration of diene traps, wherein:
the Diels-Alder adducts comprise diene (furan)-dienophile (maleimide),
the diene traps are (i) latent alkenes and (ii) selected from functional groups that will create irreversible reations with furan, wherein moles of the diene trap exceed moles of the furan;
the adhesive formulation is capable of being applied as a coating,
the adhesive formulation is capable of being extruded,
the adhesive formulation has a bonding temperature between 75 degrees Celsius and 120 degrees Celsius, and
the defeatable stimulation is a temperature above 130 degrees Celcius.

2. An adhesive film generated by the adhesive formulation according to claim 1 through coating methods.

3. An adhesive film generated by the adhesive formulation according to claim 1 through extrusion methods.

4. A textile laminate made using the adhesive formulation according to claim 1.

5. A plastic laminate made using the adhesive formulation according to claim 1.

6. A composite structure made using the ahesive formulation according to claim 1.

7. The adhesive formulation according to claim 1, wherein the adhesive formulation includes one or more additives to improve flow, bonding, or other behavior.

8. The adhesive formulation according to claim 1, wherein a mole ratio of the dienophile (maleimide) to the diene (furan) is 0.10-0.75.

9. The adhesive formulation according to claim 1, wheren a mole ratio of the dienophile (maleimide) to the diene (furan) is 0.10-0.50.

10. The adhesive formulation according to claim 1, wherein mole ratio of the dienophile (maleimide) to the diene (furan) is 0.15-0.30.

11. The adhesive formulation according to claim 1, wherein a mole ratio of the diene trap to the diene ranges from greater than 1 to −25.

12. The adhesive formulation according to claim 1, wherein a mole ratio of the diene trap to the diene ranges from 5 to −15.

13. The adhesive formulation according to claim 1 further comprising non-programmable linkages that do not disassociate upon application of the defeatable stimulation.

14. The adhesive formulation according to claim 13, wherein the non-programmable linkages include isocyanate functional groups, and a mole ratio between the programmable linkages and the non-programmable linkages is 0.01-4.0.

15. The adhesive formulation according to claim 13, wherein a mole ratio between the programmable linkages and the non-programmable linkages is 0.1-1.0.

16. The adhesive formulation according to claim 13, wherein a mole ratio between the programmable linkages and the non-programmable linkages is 0.5-0.9.

17. A method of forming an adhesive, the method comprising:
forming a polymer including a diene, a dienophile, and a diene trap, wherein:
the diene and dienophile react to form a first Diels-Alder adduct;
the diene and the diene trap react to form a second Diels-Alder adduct;
moles of the diene trap exceed moles of the diene;
a retro Diels-Alder reaction of the first Diels-Alder adduct is dominant at a defeatable temperature of the adhesive;
a retro Diels-Alder reaction of the second Diels-Alder adduct is not dominant at the defeatable temperature of the adhesive;
the first Diels-Alder adduct comprises furan-maleimide;
the diene trap is (i) a latent alkene and (ii) selected from functional groups that will create irreversible reactions with furan;
the adhesive has a bonding temperature between 75 degrees Celcius and 120 degrees Celcius; and
the defeatable temperature is a temperature above 130 degrees Celcius.

18. The method of according to claim 17, wherein the polymer further includes non-programmable linkages that do not disassociate at the defeatable temperature.

19. The method according to claim 17, wherein the concentration of diene traps comprises polybutadiene.

20. The method according to claim 1, wherein the concentration of diene traps comprises polybutadiene.

21. The method according to claim 1, wherein the adhesive formulation contains several types of the programmable linkages and the diene traps.

* * * * *